United States Patent
Waagaard et al.

(10) Patent No.: US 7,081,959 B2
(45) Date of Patent: Jul. 25, 2006

(54) METHOD AND APPARATUS FOR PROVIDING POLARIZATION INSENSITIVE SIGNAL PROCESSING FOR INTERFEROMETRIC SENSORS

(75) Inventors: Ole Henrik Waagaard, Trondheim (NO); Erlend Rønnekleiv, Trondheim (NO)

(73) Assignee: Optoplan AS, Trondheim (NO)

( * ) Notice: Subject to any disclaimer, the term of this patent is extended or adjusted under 35 U.S.C. 154(b) by 344 days.

(21) Appl. No.: 10/650,117

(22) Filed: Aug. 27, 2003

(65) Prior Publication Data

US 2005/0046860 A1    Mar. 3, 2005

(51) Int. Cl.
*G01B 9/02* (2006.01)
(52) U.S. Cl. .................... 356/491; 356/478
(58) Field of Classification Search .............. 356/477, 356/478, 479, 491
See application file for complete search history.

(56) References Cited

U.S. PATENT DOCUMENTS

| | | | |
|---|---|---|---|
| 5,173,743 A | 12/1992 | Kim | |
| 6,466,706 B1 | 10/2002 | Go et al. | |
| 6,522,797 B1* | 2/2003 | Siems et al. | ............... 356/477 |
| 6,574,015 B1 | 6/2003 | Tselikov et al. | |
| 6,856,401 B1* | 2/2005 | Rønnekleiv | ................ 356/477 |
| 2002/0025097 A1 | 2/2002 | Cooper et al. | |
| 2005/0046859 A1* | 3/2005 | Waagaard | ................... 356/478 |
| 2005/0047706 A1* | 3/2005 | Waagaard et al. | ............ 385/11 |

FOREIGN PATENT DOCUMENTS

| | | |
|---|---|---|
| GB | 2 398 867 | 9/2004 |
| WO | WO 00/79335 | 12/2000 |
| WO | WO 2004/008206 | 1/2004 |

OTHER PUBLICATIONS

U.K. Search Report, Application No. GB0419047.6, dated Nov. 19, 2004.
Canadian Office Action, Patent Application No. 2,479,245, dated Sep. 13, 2005.
GB Search Report GB Application No. 0419163.1, dated Jan. 12, 2005.
U.K. Search Report, Application No. GB 0418763.9, dated Nov. 22, 2004.

* cited by examiner

*Primary Examiner*—Gregory J. Toatley, Jr.
*Assistant Examiner*—Patrick J. Connolly
(74) *Attorney, Agent, or Firm*—Patterson & Sheridan, L.L.P.

(57) ABSTRACT

A method and apparatus that uses specific source modulation and detectors to detect a response that carries information about a system response matrix associated with each sensor in a interferometric sensor array and extracting a sensor response in a manner that eliminates polarization-induced signal fading and that is insensitive to lead fiber birefringence fluctuations.

52 Claims, 8 Drawing Sheets

METHOD AND APPARATUS FOR PROVIDING POLARIZATION INSENSITIVE SIGNAL PROCESSING FOR INTERFEROMETRIC SENSORS

CROSS-REFERENCE TO RELATED APPLICATIONS

This application contains subject matter that is related to the subject matter described in U.S. patent application Ser. No. 10/649,588, filed Aug. 27, 2003 and U.S. patent application Ser. No. 10/649,590, filed Aug. 27, 2003, which are both incorporated herein by reference in their entirety.

BACKGROUND OF THE INVENTION

1. Field of the Invention

The present invention relates to interferometric sensors and, more particularly, the present invention relates to a method and apparatus for providing polarization-induced phase noise insensitive signal processing for interferometric sensors.

2. Description of the Related Art

When using interferometric sensors, the input light to the sensor is split into two paths (i.e., a reference path and a sensor path) and recombined. The reference path is a path from the transmitter to the receiver via a first path of the sensor, while the sensor path is the path from the transmitter to the receiver via a second path of the sensor. The path that experiences a length change due to a disturbance within the sensor, usually the longest path, forms the sensor path and the other path forms the reference path. The portions of fiber that are common to both the sensor path and the reference path define the lead fibers. The light beams that travel along the two paths are combined to form an interference signal that is altered by the magnitude of the disturbance. If the nominal path lengths are different, the interferometer is said to be unbalanced, and the imbalance is equal to the difference in time-delay experienced by the light propagating in the two paths. The change in length difference between the two paths is measured by extracting the phase of the interference between the light that has propagated the two paths. The visibility of the interference depends on the state of polarization (SOP) of the two interfering light beams. The SOP of the two interfering light beams depends on the input polarization state into the interferometer as well as the retardance and the orientation of the polarization eigenstates of the two paths of the interferometer. Although the SOP of the light propagating in the reference and sensor paths may begin parallel, the propagation along the fibers may alter the SOP of each light beam such that the SOPs of the two interfering light beams may no longer be parallel. As the SOP of the interfering light beams approach orthogonality, the visibility worsens, and if SOPs are orthogonal, the visibility is zero and the interference signal can not be measured. This effect is known as polarization fading. The interferometer has two polarization eigenstates that represent the maximum and minimum phase of the interferometer. Depending on the input SOP, the measured interferometer phase can be any value between the phases of the two polarization eigenstates. Thus, if the sensor is birefringent, fluctuations in the SOP of the lead fiber will induce phase noise.

In an application such as interferometric seismic sensor monitoring, the lead fiber from the interrogation unit to the sensor can be of substantial length and sensitive to environmental effects such as vibrations, bending and temperature. The noise performance of such sensor arrays may be limited by the polarization fluctuations in the lead fiber induced by environmental effects. See A. D. Kersey, M. J. Marrone, and A. Dandridge, "Observation Of Input-Polarization-Induced Phase Noise In Interferometric Fiber-Optic Sensors", Optics Letters, 13(10):847–849, 1988.

Several methods have been proposed to eliminate the problem of polarization fading in interferometric sensors while there are few methods that eliminate the phase noise that is induced by variations in the input polarization to the sensor and the retardance variations in the sensor. The polarization-induced phase noise can be eliminated using depolarized light; however this method does not solve the fading problem. See A. D. Kersey, M. J. Marrone, and A. Dandridge, "Analysis Of Input-Polarization Induced Phase Noise In Interferometric Fiber-Optic Sensors And Its Reduction Using Polarization Scrambling", IEEE Journal of Lightwave Technology, 8(6):338–845, 1990.

Several methods for reduction or elimination of the polarization fading problem are known. One known method uses Faraday rotating mirrors, as disclosed by A. D. Kersey et al. in "Polarisation Insensitive Fibre Optic Michelson Interferometer", El. Lett., Vol. 27, pp 518–19, 1991. This method allows for a simple source and detection system, but it works only for a Michelson interferometer configuration. Furthermore, the Faraday rotating mirrors may be expensive, space consuming, and sensitive to extreme thermal, electromagnetic and other environmental conditions.

Another widely used method is to use a polarization diversity receiver based on three polarizers that are angularly spaced by 120°, and the output with best visibility is selected. See N. J. Frigo et. al in "Technique For Elimination Of Polarization Fading In Interferometers", El. Lett. Vol 20, pp. 319–320, 1984.

Other known methods are based on active polarization control at the input to optimize the visibility of the interference, as disclosed by A. D. Kersey et. al. in "Optimization And Stabilization Of Visibility In Interferometric Fiber-Optic Sensors Using Input-Polarization Control", J. of Lightwave Technol., Vol. 6, pp. 1599–1609, 1988. When several sensors are multiplexed, this method requires input-polarization control of each multiplexed sensor, which makes it impractical for remote and inaccessible sensor arrays. Alternatively, one can optimize the visibility of the worst sensor in the array. See M. Tur et. al. in "Polarization-Induced Fading In Fiber-Optic Sensor Arrays", J. of Lightwave Technol., Vol. 13, pp. 1269–1276, 1995. A statistical treatment shows, the probability that the visibility is larger than 0.6 for all sensors in a 10-element sensor array is 80%, however the visibility worsens as the number of sensors is increased. The visibility can also be optimized by the use of the polarizer combined with active polarization control at the output end, as disclosed by K. H. Wanser et. al. in "Remote Polarization Control For Fiber-Optic Interferometers", Opt. Lett., Vol. 12, pp. 217–19, 1987. In both cases the polarization controller is continuously adjusted to optimize the fringe visibility. These techniques require relatively complex systems to provide feedback signals to the polarization controller. The polarization modulator used for the polarization control must be capable of modulating the SOP in three dimensions on the Poincaré sphere.

The only previously reported method that eliminates polarization induced fading and noise, is based on modulation of the SOP between two polarizations with a modulation frequency that is an odd multiple of one forth of the free spectral range (FSR) of the sensor, and detection of four independent interference signals. See E. Ronnekleiv in "Elimination Of Polarization Fading", International patent application number WO 00/79335 (filed Jun. 22, 2000). In systems that employ a continuous wave source such as wavelength division multiplexing (WDM), the minimum modulation frequency of one forth of the sensor FSR, gives a minimum detection bandwidth equal to the sensor FSR. In conventional CW interrogation, the minimum detection bandwidth is given by the information bandwidth of the interferometric signal. Thus, the minimum detection bandwidth required for this method is much larger than necessary for CW interrogation of interferometric sensors. In time division multiplexing (TDM) two-pulse interrogation, as disclosed in J. P. Darkin in "An Optical Sensing System", UK patent application number 2126820A (filed Jul. 17, 1982), the four independent interference signals must appear within one sensor imbalance. Thus, the source polarization must be modulated with a modulation frequency that is at least 5/4 of the sensor FSR, which is the inverse of the sensor imbalance. The duration of the detected pulses is at maximum 1/5 of the duration of the detected pulses with conventional two-pulse interrogation, and thus the detection bandwidth is at least five times higher. For a typical sensor imbalance of 5 m, the FSR is equal to 20 MHz, and the required detection bandwidth must be at least 100 MHz. This high detection bandwidth makes this method impractical for TDM two-pulse interrogation.

Therefore, there is a need in the art for a method and apparatus that eliminates the polarization-induced signal fading and provides polarization-induced phase noise insensitive signal processing for interferometric sensors.

SUMMARY OF THE INVENTION

The invention provides a method and apparatus that uses specific source modulation and/or unique detectors to measure a response Jones matrix as a measure for the sensor Jones matrix, which describes the polarization dependent response from the sensor. The response Jones matrix describes the propagation through the sensor path relative to the reference path and depends on the lead fiber birefringence. The difference and average of the phase of the two eigenvalues of the sensor Jones matrix can be used as a measure for differential birefringence phase and common mode phase in the interferometer, respectively. Even though the response Jones matrix and the sensor Jones matrix may be different, the phase of the eigenvalues will be equal for the two matrices. Thus, these phase measurements are unaffected by lead fiber birefringence.

In a first embodiment of the invention, a pulsed source for the interferometric sensor array is used. The SOP of the interrogation pulses is controlled individually so that two interfering pulses may originate from interrogation pulses that have different SOP such that at least four components of the detected signal can be separated and processed to extract a phase measurement from the response Jones matrix without error caused by polarization induced fading or noise caused by birefringence fluctuations in the lead fibers.

In a second embodiment, the at least four signal components that are required for a measurement of the response Jones matrix are separated by continuous or stepwise modulation of transmitter output SOP along a predefined path on the Poincaré sphere through at least four polarization states that can be represented by four independent Stokes vectors and detection of at least four independent signal components of the generated output intensity modulation.

In a third embodiment, the source light is depolarized and a receiver incorporates polarizers, where each of the polarizers transmits a different SOP that defines a set of eigenpolarization states. The eigenpolarization states can be represented by at least four independent Stokes vectors, and the response matrix is found from the outputs of the polarizers. It follows from reciprocity that the measurement provided by the third embodiment is equivalent to the measurement provided by the second embodiment.

A forth embodiment combines the modulation of the transmitter output SOP of the second embodiment with the polarization diversity receiver of the third embodiment. The transmitter output SOP is modulated through a set of states that includes at least three independent Stokes vectors and the polarizers within the polarization diversity receiver defines a set of eigenpolarizations that can be represented by two independent Stokes vectors. This may give six independent signal components from which the response matrix can be found.

A fifth embodiment is a reciprocal version of the forth embodiment where the transmitter output SOP is modulated through a set of states that includes at least two independent Stokes vectors and the polarizers within the polarization diversity receiver defines a set of eigenpolarizations that can be represented by three independent Stokes vectors.

These embodiments may be used with various modulation formats including homodyne and heterodyne techniques and multiplexing techniques including time division multiplexing (TDM), wavelength division multiplexing (WDM), frequency division multiplexing (FDM) or combinations thereof.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
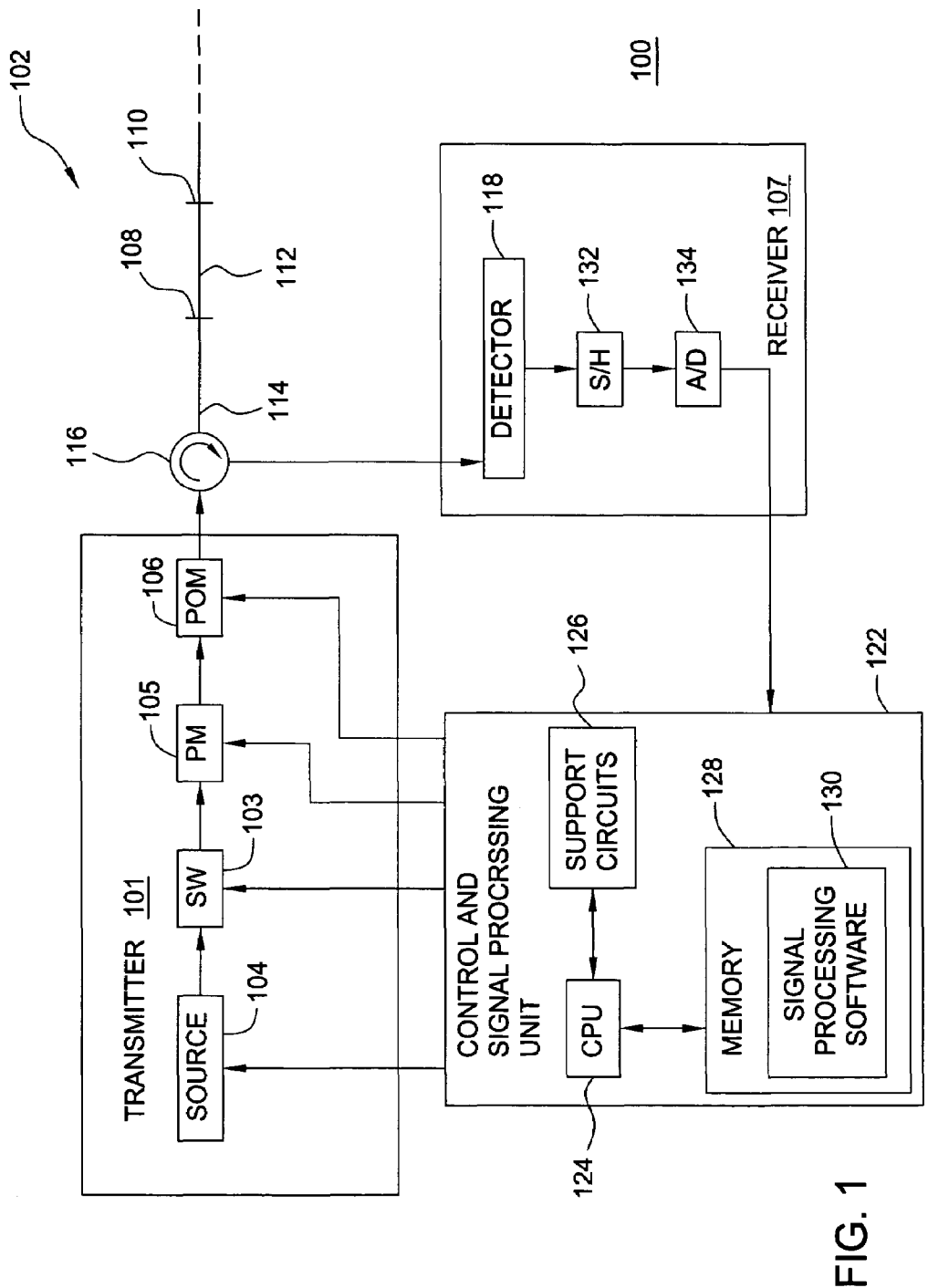
FIG. 1 depicts a block diagram of a first embodiment of the present invention.

FIG. 1 depicts a first embodiment of the present invention incorporated into an optical interferometer sensor system 100. The optical interferometer sensor system 100 comprises a transmitter 101, a receiver 107, an optical circulator 116, a sensor array 102, and a control and signal processing unit 122. The transmitter 101 comprises a source 104, a Mach-Zender switch 103, a phase modulator 105 and a polarization modulator 106. The receiver 107 comprises a detector 118, a sample-and-hold (S/H) circuit 132 and an analog-to-digital (A/D) converter 134. The source 104 is a light source such as a laser. The light from the source 104 is pulsed by switch 103, phase modulated by phase modulator 105 and polarization modulated by the modulator 106 to form polarization-induced phase noise insensitive interrogation pulses as described below. Preferably, the fibers that interconnect components within the transmitter should be polarization maintaining fibers so that the polarization into the polarization modulator 106 does not vary. The modulated light produced by the transmitter 101 is coupled to the sensor array 102 through the circulator 116.

The sensor array 102 may comprise one or more Fabry-Perot (FP) interferometers having a lead fiber optic cable 114, a reference reflector 108, at least one length of fiber optic cable 112 and at least one sensor reflector 110. The FP interferometer sensor array 102 may contain multiple sensors that may be positioned along one or more parallel fibers that branch from the lead fiber 114. A sensor is formed by a length of fiber between reflectors (e.g. fiber 112 between reflectors 108 and 110). The reflectors 108 and 110 may be fiber Bragg gratings (FBG) that are formed along the fiber. Other forms of interferometers will function in the context of the present invention including Michelson interferometers, Mach-Zender (MZ) interferometers, and the like. In each form of interferometer, the amplitude of the reflected interference signal at detector 118 varies according to the phase difference between the light that has propagated the sensor path (lead fiber 114, fiber 112 and reflector 110) and the light that has propagated the reference path (in the FP interferometer, the reference arm is lead fiber 114 and reference reflector 108). The circulator 116 channels light that is reflected from the sensor array 102 to the detector 118. It is also possible to use a directional coupler for this purpose. The analog output of the detector 118 is processed by the S/H circuit 132 and digitized by the A/D converter 134. The interference signal of combined light components from both paths is measured and changes in the pattern indicate a relative physical disturbance of the sensor.

The source 104, the switch 103, the phase modulator 105 and the polarization modulator 106 are controlled by the control and signal processing unit 122. The control and signal processing unit 122 comprises a central processing unit (CPU) 124, support circuits 126 and memory 128. The CPU 124 may be any processing unit that is capable of signal processing as well as controlling system functionality. Although a single CPU 124 is shown and discussed herein, those skilled in the art will realize that multiple processing units may be used wherein one processing unit may be used for controlling the components of the transmitter and another processor may be used for signal processing. The support circuits 126 comprise well known circuits such as cache, power supplies, timing circuitry, input/output circuits, and the like. The memory 128 may comprise one or more of random access memory, read only memory, removable storage, disk drive storage, and the like. The memory 128 stores signal processing software that facilitates computing the sensor phase for the reflected signals from the sensor array 102.

One embodiment of the invention uses time division multiplexing (TDM) to form the interrogation signal by controlling the source 104, the switch 103, the phase modulator 105 and the polarization modulator 106. In one version of TDM pulsed interrogation of the interferometric sensors, two interrogation pulses are generated within each repetition period $T_r$. The second pulse propagating in the short (reference) path of the interferometer and the first pulse propagating in the long (sensing) path of the interferometer will overlap at the detector if the separation between the end of the first pulse and the start of the second pulse is less than the sensor imbalance. Maximum overlap is achieved when the delay between the start of the first pulse and the start of the second pulse is equal to the sensor imbalance. The phase modulator 105 induces a phase shift $\Delta\phi(n)$ between the two pulses of each pulse pair, where n is a number that increases by one for each repetition period $T_r$. The reflected signals from different sensors will arrive at different times due to the spatial distribution of the sensors. The repetition period is selected such that reflected signals from all multiplexed sensors are received within one period. The phase modulation $\Delta\phi(n)$ between the interrogation pulses of each pulse pair results in one or a plurality of sub-carriers on the interference signal from which the amplitude and sensor phase are calculated. In this embodiment, the phase difference is linear, i.e. $\Delta\phi(n)=\omega nT_r$, where $\omega$ is the sub-carrier frequency, resulting in only one sub-carrier on the interference signal. In other modulation techniques, such as phase-generated carrier modulation, $\Delta\phi(n)$ is not a linear function, which results in several sub-carriers on the interference signal.

The response Jones matrix is found by switching of the source polarization. Let $E_0(n)=[E_{0x}(n)\ E_{0y}(n)]^T$ and $E_1(n)=[E_{1x}(n)\ E_{1y}(n)]^T \exp(-j\Delta\phi(n))$ be the Jones vector describing the state of polarization (SOP) of the first and the second interrogation pulse, respectively. The switch 103 forms the pulses of light, the phase modulator 105 applies the phase modulation $\Delta\phi(n)$ to the second pulse, and the polarization modulator 106 switches the polarization of each pulse. The second pulse propagating in the short (reference) path of the interferometer and the first pulse propagating in the long (sensing) path of the interferometer will interfere at the detector. The SOP of the pulses that have propagated in the reference path $E_r(n)$ and the sensing path $E_s(n)$ are given by, $$E_r(n)=B_u B_d E_1(n) \quad (1)$$

$$E_s(n)=B_u R_s B_d E_0(n) \quad (2)$$

where $B_d$ is the Jones matrix describing the down-lead fiber from the source to the sensor, $B_u$ is the Jones matrix describing the up-lead fiber from the sensor to the detector, and $R_s$ is the Jones matrix of the sensor. The response Jones matrix is defined as $R=B_d^\dagger B_u^\dagger B_u R_s B_d$. The interference between $E_r(n)$ and $E_s(n)$ is given by, $$\begin{aligned}l(n) &= 2\mathrm{Re}\{E_r^\dagger(n)^x E_s(n)\} \quad (3)\\ &= 2\mathrm{Re}\{E_1^\dagger(n)B_d^\dagger B_u^\dagger B_u R_s B_d E_0(n)\}\\ &= 2\mathrm{Re}\{E_1^\dagger(n)RE_0(n)\} \quad (4)\\ &= 2\mathrm{Re}\{[R_{xx}E_{1x}^*(n)E_{0x}(n) + R_{xy}E_{1x}^*(n)E_{0y}(n) +\\ &\quad R_{yx}E_{1y}^*(n)E_{0x}(n0) + R_{yy}E_{1y}^*(n)E_{0y}(n)]\exp(j\omega nT_r)\},\end{aligned}$$

where † is the conjugate transpose matrix operation and $R_{xx}$, $R_{xy}$, $R_{yx}$, and $R_{yy}$ are the four components of R. This equation shows that the four components of R can be found when a modulation is applied to the source polarization so that the four interference terms $R_{xx}E^*_{1x}(n)E_{0x}(n)$, $R_{xy}E^*_{1x}(n)E_{0y}(n)$, $R_{yx}E^*_{1y}(n)E_{0x}(n)$ and $R_{yy}E^*_{1y}(n)E_{0y}(n)$ can be extracted from four independent measurements provided that the interrogation Jones matrices $E_0(n)$ and $E_1(n)$ are known.

The sensor phase $\phi_s$ is defined as 0.5 times the phase of the determinant of $R_s$, which is equal to the phase of the geometrical mean of the two eigenvalues. It can be shown that $\angle \det R_s = \angle \det R$:

$$\angle \det R = \angle \det (B_d^\dagger B_u^\dagger B_u R_s B_d) \quad (5)$$
$$= \angle((\det B_d)*(\det B_u)*(\det B_u)(\det R_s)(\det B_d))$$
$$= \angle(|\det B_d|^2|\det B_u|^2\det R_s) = \angle \det R_s$$

Thus, the measured components of R can be used to calculate the sensor phase as $\phi_s = 0.5\angle \det R_s = 0.5\angle \det R = 0.5\angle(R_{xx}R_{yy} R_{xy}R_{yx})$, and the measurement of the sensor phase $\phi_s$ can be made independent of polarization fluctuations in the lead fiber, and if the sensor array does not have any component with polarization dependent loss (PDL), the fading factor defined as the magnitude of the complex number from which the sensor phase is extracted divided by the maximum interference amplitude for any interrogation polarization, will be constant and equal to 1.

If the lead fiber to the sensor does not comprise polarization dependent loss (PDL), $B_u$ and $B_d$ are described by real scalars multiplied by a unitary matrix. One property of unitary matrices is that the inverse and the conjugate transpose of the matrix are equal. Then $B_u^{\dagger B}B_u = k^2 I$, where I is the identity matrix, and k is a real scalar. $B_d$ only rotates the coordinate system in which the matrix $R_s$ is measured. The eigenvalues of a matrix are independent of the orientation of the coordinate axes. Thus the eigenvalues of R are equal to the eigenvalues $R_s$. Once the eigenvalues of a sensor Jones matrix is found, both the common mode sensor phase and the differential birefringent phase between the eigenpolarization states of the sensor can be calculated. In a polarimetric sensor, the measurand causes changes in the phase between the eigenpolarizations. Thus, the present invention allows for the use of a single sensor as both an interferometric sensor and a polarimetric sensor. The sensor can then measure two physical parameters simultaneously such as temperature and pressure.

In one embodiment of the present invention, the polarization modulator 106 switches the transmitter output SOP between the two orthogonal polarization states x and y. In a sequence of four consecutive pulse pairs, both pulses of the first pulse pair are x-polarized, the first pulse of the second pulse pair is x-polarized and the second is y-polarized, both pulses of the third pulse pair are y-polarized, and the first pulse of the forth pulse pair is y-polarized and the second pulse is x-polarized. Although, these four pulse pairs have a specific order, those skilled in art should realize that the order of these four pulse pairs is arbitrary. All pulse pairs in the sequence of pulse pairs that have the same SOPs, defines a polarization channel. These four channels are denoted xx, xy, yy, and yx. In each of these polarization channels, only one of the terms, $R_{xx}E^*_{1x}(n)E_{0x}(n)$, $R_{xy}E^*_{1x}(n)E_{0y}(n)$, $R_{yx}E^*_{1y}(n)E_{0x}(n)$ and $R_{yy}E^*_{1y}(n)E_{0y}(n)$ will be non-zero.

Figure 2:
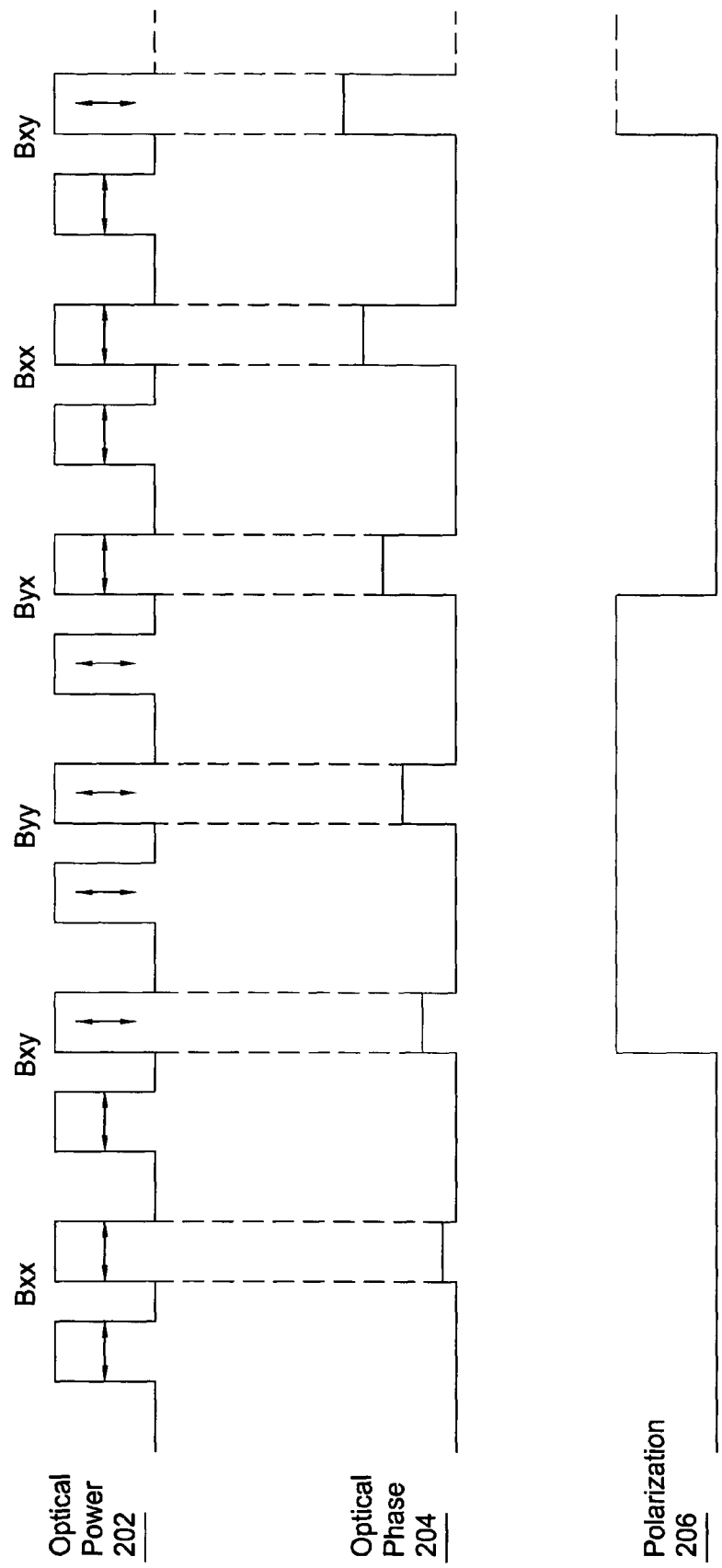
FIG. 2 depicts a timing diagram for the embodiment in FIG. 1.

FIG. 2 depicts a timing diagram 200 of the optical power 202, phase 204 and polarization 206 of the two interrogation pulses. The source 104 outputs one pulse pair per repetition period $T_r$, and the phase is modulated according to timing diagram 204. The polarization modulator 106, such as an electro-optical modulator, switches the polarization of the pulses according to timing diagram 206. The timing diagram shows the polarization of the pulses in the repeated sequence xx, xy, yx and yy as arrows within each pulse, which represent the four polarization channels. With the interrogation field intensity normalized to 1, the interference intensity I(n) of the detected pulses as a response from the interferometer interrogated by the pulse pairs of the four polarization channels is given by, Polarization channel xx: $I_{xx}(m)=2Re\{R_{xx}e^{j\omega mT_r}\}m=4n$ (6)

Polarization channel xy: $I_{xy}(m)$
$=2Re\{R_{xy}e^{j\omega mT_r}\}m=4n+1$ (7)

Polarization channel yy: $I_{yy}(m)$
$=2Re\{R_{yy}e^{j\omega mT_r}\}m=4n+2$ (8)

Polarization channel yx: $I_{yx}(m)$
$=2Re\{R_{yx}e^{j\omega mT_r}\}m=4n+3$, (9)

The sequence $I_{xx}(m)$ represents a harmonic varying signal with a frequency given by the sub-carrier frequency $\omega$. For each sub-carrier period, the phase and amplitude of $I_{xx}(m)$ are calculated relative to the generated sub-carrier. The resulting complex number equals the $R_{xx}$ component of the response Jones matrix. In polarization channel xy, yy and yx the $R_{xy}$, $R_{yy}$ and $R_{yx}$ components are measured, respectively.

Figure 6:
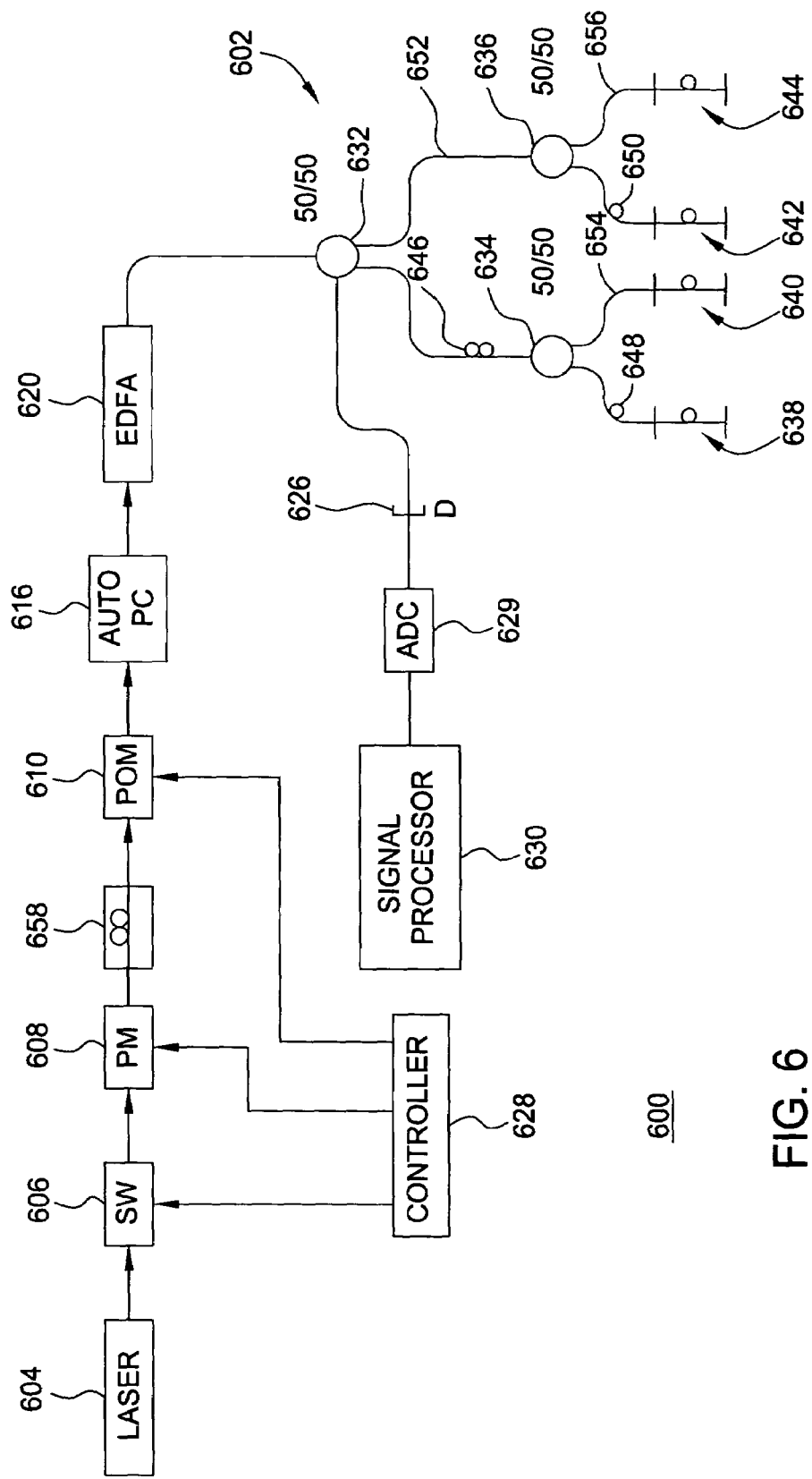
FIG. 6 is a block diagram of a test set up for testing the first embodiment of the invention.

FIG. 6 depicts an experimental setup 600 for interrogation of Fabry-Perot star-network 602 using TDM pulsed interrogation as discussed above. The setup 600 comprises a fiber laser 604, Mach-Zender switch 606, phase modulator 608, a first polarization controller 658, polarization modulator 610, automatic polarization controller 616, erbium-doped fiber amplifier 620, detector 626 and an analog-to-digital converter 628. The hardware was controlled by controller 630 and the detected signals were processed by signal processor 632. The star network 602 comprises three 50/50% couplers 632, 634 and 636, sensors 638, 640, 642 and 644 (each comprising the reflectors and a length of cable), delay coils 646, 648 and 650, and fibers 652, 654 and 656.

The method for elimination of polarization-induced fading and phase noise was tested on the Fabry-Perot star-network 602 with four sensors 638, 640, 642 and 644. Two fiber Bragg gratings (FBGs) with ~30% reflectivity were used as reflectors in each of sensor. The length of the sensor coils was 18 m. The sensor coils were wound on PZT-cylinders and placed in an acoustically sealed box. The three 50/50% telemetry couplers 632, 634 and 636 were used to supply signals to the sensors 638, 640, 642 and 644. The delay coils 646, 648 and 650 were used to ensure that the reflections from the second, third and forth sensor were delayed by approximately 1 μs, 2 μs and 3 μs compared to the first sensor reflections, respectively.

A RIN and frequency stabilized DFB fiber laser (DFB-FL) was used as source 604. The wavelength of the source was 1548 nm, corresponding to the center wavelength of the FBGs. The TDM repetition period was $T_r=5$ μs. Two 140 ns optical pulses were generated in each repetition period by the electro-optical Mach-Zender switch (SW) 606. The delay from the start of the first pulse to the start of the second pulse was 180 ns, thus equal to the sensor imbalance. The electro-optical phase modulator (PM) 608 was used to modulate the phase of the second pulse relative to the first pulse linearly from 0 to $2\pi$ within one sub-carrier period $2\pi/\omega=80$ μs. The fiber from the switch 606 to the phase modulator 608 was polarization maintaining to ensure polarization independent operation. The output from the modulator 608 was further guided via a polarization controller (PC1) 658 that transformed the input polarization into an electro-optical polarization modulator (POM) 610, so that equal amounts of optical power were coupled into the TE mode and the TM mode of the modulator 610. The signal applied to the POM 610 was switched between two calibrated levels. The phase difference between the two modes changed according to the applied signal level, and the POM 610 produced two orthogonal polarization states. The polarization of the pulse pairs was modulated in a repeated sequence of the four polarization channels, as illustrated in FIG. 2. With this modulation scheme, each of polarization channels consists of four pulse pairs per sub-carrier period.

The sequence of reflected signals from the sensor array is detected by the photo detector 626, and the sequence is sampled by the analog-to-digital converter 628. The digitized signal is processed by the signal processor 630. The signal processor unit extracts the Jones matrix of each individual sensor and calculates the sensor phase as 0.5 times the phase of the determinant of the Jones matrix.

The automatic polarization controller 616 that squeezes the fiber between two PZT-elements, emulated polarization fluctuations in the lead fiber. The polarization controller was driven at a frequency of 75 Hz with approximately $2\pi$ differential phase amplitude.

Figures 7A, 7B, 7C:
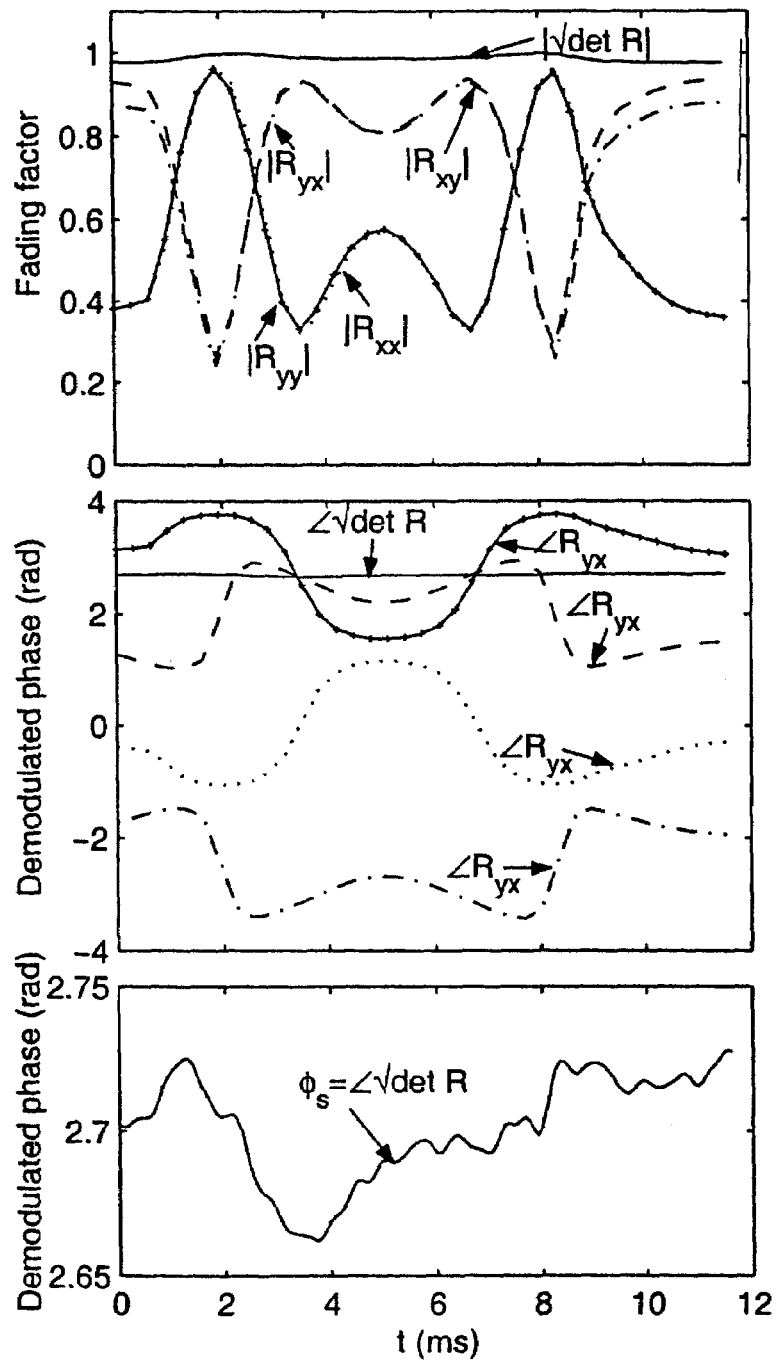
FIGS. 7A, 7B and 7C depict graphs of the demodulated phase and visibility of each of four demodulated polarization channels for the test set up of FIG. 6.

FIGS. 7A, 7B, and 7C show the demodulated phase and the fading factor of each of the four demodulated polarization channels of sensor 638. The figure also shows the sensor phase calculated as $0.5 \angle \det R$ and the combined fading factor calculated as $\sqrt{|\det R|}$, which is equal to the geometrical mean of the eigenvalue amplitudes. Demodulation of each polarization channel is equivalent to two-pulse demodulation without any use of polarization handling techniques. The demodulated phase and fading factor of all polarization channels show strong dependence on the input polarization. If the lead fiber and the sensor array do not include any polarizing component, R can be written $ke^{j\phi_s}U$, where k is a proportionality constant, $\phi_s$ is the sensor phase and U is an unitary matrix:

$$R = ke^{j\phi_s}U \qquad (10)$$

$$= ke^{j\phi_s}\begin{bmatrix} U_{xx} & U_{xy} \\ U_{yx} & U_{yy} \end{bmatrix}$$

$$= ke^{j\phi_s}\begin{bmatrix} \cos\theta e^{j\alpha} & \sin\theta e^{j\beta} \\ -\sin\theta e^{-j\beta} & \cos\theta e^{-j\alpha} \end{bmatrix}.$$

Here, $\theta$, $\alpha$ and $\beta$ are arbitrary phases. $U_{yy}$ is the complex conjugate of $U_{xx}$, and $U_{yx}$ is the complex conjugate of $-U_{xy}$. The amplitude of the diagonal elements of U is maximum when the off-diagonal elements are zero, and visa versa. This agrees with the measured behavior of R: The $R_{xx}$ and $R_{yy}$ components have approximately the same fading factor, while the variations in demodulated phase have opposite signs. The $R_{xy}$ and $-R_{yx}$ components show the same relationship as $R_{xx}$ and $R_{yy}$.

Equation (10) shows that detected sensor response will never fade if either of the two components $R_{xx}$ and $R_{yy}$ and either of the two components $R_{xy}$ and $R_{yx}$ are measured. From the two components one may choose to always demodulate the component with the best fading factor. This will produce a fading factor between 0.5 and 1, thus the demodulated signal will never fade. However, the phases $\alpha$ and $\beta$ are arbitrary, thus demodulation of the sensor response based on only two of the response Jones matrix components will not provide a phase readout that is insensitive to birefringence fluctuations in the lead fiber. This demonstrates that all four components of R must be measured to ensure polarization induced phase noise insensitive interrogation.

FIG. 7A shows that the combined fading factor of the demodulated signals calculated as $\sqrt{|\det R|}$ is between 0.98 and 1, while the peak-to-peak variation in demodulated sensor phase is only 32 mrad. FIG. 7B shows the peak-to-peak variations of the phase of the components $R_{xx}$, $R_{xy}$, $R_{yx}$ and $R_{yy}$, where the $R_{xx}$ and the $R_{yy}$ component vary by 2.2 rad. FIG. 7C shows a magnification of the polarization independent sensor phase $\sqrt{|\det R|}$ of FIG. 7B. Thus, the proposed method has reduced the sensitivity of the demodulated sensor phase to input polarization fluctuation by at least 36 dB, and the variation in fading factor is reduced to only 2%.

Figure 8:
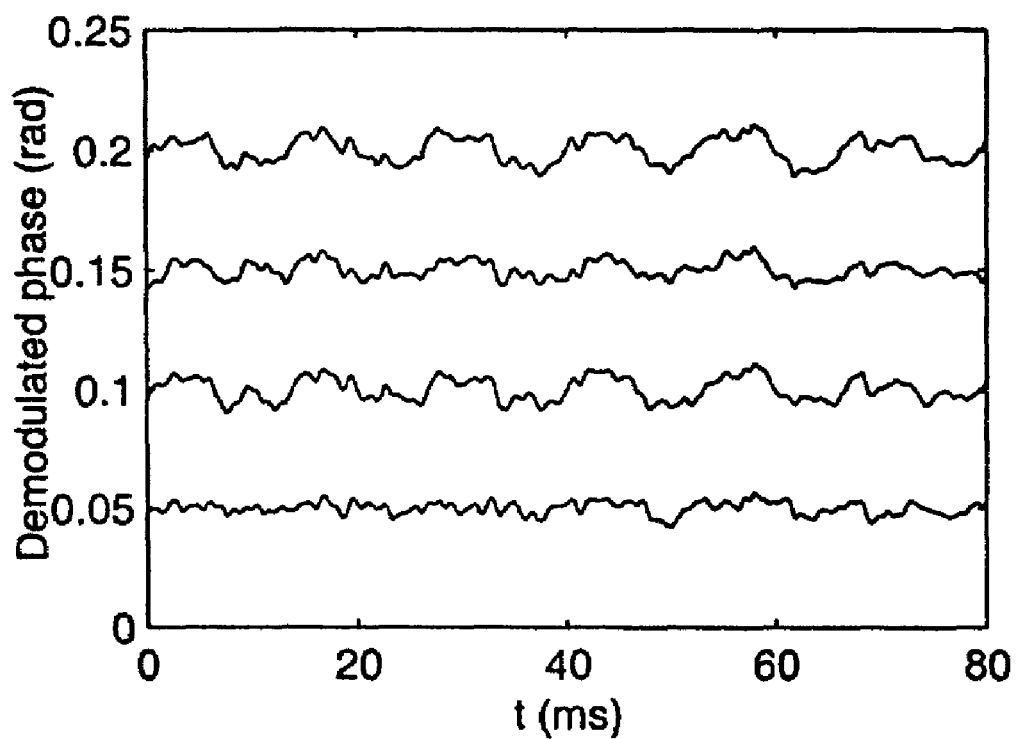
FIG. 8 shows the simultaneously measured demodulated phase of all four time-division multiplexed sensors in the test set up of FIG. 6.

FIG. 8 shows the simultaneously measured demodulated phase of all four time-division multiplexed sensors in the network when the input polarization into the array was modulated. All the sensors show a variation in demodulated phase less than 22 mrad. Thus, suppression of polarization-induced noise is achieved for all sensors in the network. When demodulating every component of the Jones matrices of the sensors individually (not shown in the figure), the maximum phase variation of 2.3 rad was observed in $R_{xx}$ component of sensor 4.

In another version of the first embodiment, the four components of R can be separated in the frequency domain. With the Jones vectors of the two interrogation pulses given by $E_0(n) = [1 \; e^{-j(\omega_{yx}-\omega_{yy})nT_r}]^T$ and $E_1(n) = [e^{-j\omega_{xx}nT_r} \; e^{-j\omega_{yx}nT_r}]^T$, Equation (4) becomes $$I(n) = 2Re\{R_{xx}e^{j\omega_{xx}nT_r} + R_{yy}e^{j\omega_{yy}nT_r} + R_{xy}e^{j\omega_{xy}nT_r} + R_{yx}e^{j\omega_{yx}nT_r}\}, \qquad (11)$$

where $\omega_{xx}$, $\omega_{yx}$, $\omega_{yy}$ and $\omega_{xy} = \omega_{xx} - \omega_{yx} + \omega_{yy}$ are four different sub-carrier frequencies that are chosen so that the four components are separable in the frequency domain.

Figure 3:
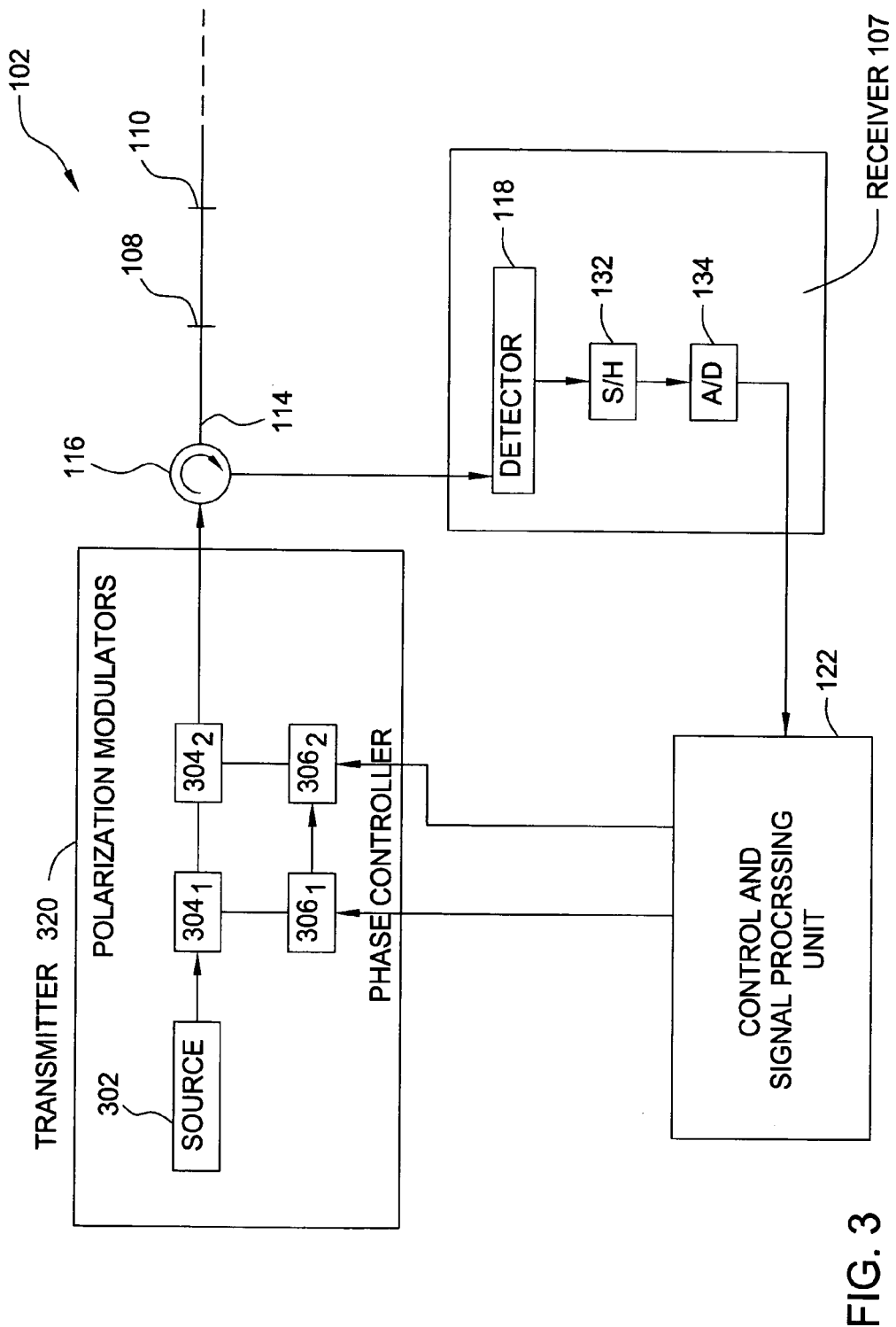
FIG. 3 is a block diagram of a second embodiment of the present invention.

The first embodiment described above is based on having the SOPs of the interrogation pulses controlled individually so that two interfering pulses may originate from interrogation pulses that have different SOP. This embodiment only works for pulsed interrogation systems. FIG. 3 depicts a block diagram of the second embodiment of the present invention. In this embodiment, the two interfering beams may originate from the same transmitter output SOP, and the modulation of the transmitter output SOP can be made independent of the sensor imbalance. This allows for this method to be used in combination with both pulsed TDM and other multiplexing techniques that employs a CW (continuous wave) source such as frequency division multiplexing (FDM) and wavelength division multiplexing (WDM). In FDM, the laser frequency is swept over a range larger than the free spectral range of the interferometers, and different electrical signal frequencies are generated at the detector corresponding to different delay difference of the two interfering signals. One version of FDM is imbalance division multiplexing (IDM), where different sensors have different imbalances. In WDM, the response from each sensor appears at different wavelengths.

The source 302 may be similar to source 104 in FIG. 1, but may also include the switch 103 and the phase modulator 105. The polarization modulator 106 of FIG. 1 is replaced by a pair of polarization modulators 304₁ and 304₂ and a pair of phase controllers 306₁ and 306₂. The source 302, the polarization modulators 304₁ and 304₂ and the phase controllers $306_1$ and $306_2$, define the transmitter 320. The other components of FIG. 3 are substantially similar to the embodiment of FIG. 1 and are numbered as such. These polarization modulators modulate the differential phase between the two orthogonal modulation axes of the modulators. On the Poincaré sphere, the output SOP is represented by a point on a circle that is normal to the modulation axes and includes the input SOP.

In combination with TDM, this technique is similar to the one presented with respect to FIGS. 1 and 2 above; however, the polarization modulation is equal for both interrogation pulses, thus $E_1(n) = E_0(n)\exp(-j\Delta\phi(n)) = E(n) \exp(-j\Delta\phi(n))$. The SOP of the transmitter output is described by a time-varying Jones vector $E(t)$. In FDM and CW-interrogated WDM, t is a continuous time-variable. For TDM t is modeled as a discrete variable $t=nT_r$, so that $E(t)=E(n)=E(nT_r)$. The transmitter output SOP can also be described by a transmitted Stokes vector $S^t(t)=[S_0^t(t), S_1^t(t), S_2^t(t), S_3^t(t)]$. The relation between the transmitted Stokes vector and the Jones vector $E(t)=[E_x(t)\, E_y(t)]^T$ is given by:

$$S_0^t(t) = |E_x(t)|^2 + |E_y(t)|^2$$

$$S_1^t(t) = |E_x(t)|^2 - |E_y(t)|^2$$

$$S_2^t(t) = 2\text{Re}(E^*_y(t)E_x(t))$$

$$S_3^t(t) = -j2\text{Im}(E^*_y(t)E_x(t)) \quad (11)$$

Here, $S_0^t(t)$ describes the total optical power, $S_1^t(t)$ describes the difference in optical power between the vertical and horizontal polarized component, $S_2^t(t)$ describes the difference in optical power between the linear 45° and linear −45° polarized component, and $S_3^t(t)$ describes the difference in optical power between left and right circular component.

In order to analyze the interference between the light beams that have propagated in the reference path and the sensing path, an effective Stokes vector is defined:

$$S_0^{eff}(t) = (E^*_x(t)E_x(t-\tau_s) + E^*_y(t)E_y(t-\tau_s))e^{-j\Delta\phi(t)}$$

$$S_1^{eff}(t) = (E^*_x(t)E_x(t-\tau_s) - E^*_y(t)E_y(t-\tau_s))e^{-j\Delta\phi(t)}$$

$$S_2^{eff}(t) = (E^*_y(t)E_x(t-\tau_s) + E^*_x(t)E_y(t-\tau_s))e^{-j\Delta\phi(t)}$$

$$S_3^{eff}(t) = j(E^*_y(t)E_x(t-\tau_s) - E^*_x(t)E_y(t-\tau_s))e^{-j\Delta\phi(t)} \quad (12)$$

The phase term $\Delta\phi(t)$ is the applied phase modulation of the source, which generates one or a plurality of sub-carrier on the interference signal. In this embodiment $\Delta\phi(t) = \omega_t$, where $\omega$ is the sub-carrier frequency of the interference signal. In other embodiments, $\Delta\phi(t)$ may not be a linear function of time. The term $\exp(-j\Delta\phi(t))$ in (12) ensures that the applied phase modulation is not included in the definition of the Stokes vector. The definition of the effective Stokes vector in (12) deviates from the definition of the transmitted Stokes vector in (11) by the inclusion of the delay term $\tau_s$. This is to compensate for the sensor imbalance. These two definitions become equal when the transmitter output SOP is modulated with a rate that is substantially smaller than the sensor FSR $1/\tau_s$, i.e., $E(t) \approx E(t-\tau_s)\exp(-j\Delta\phi(t))$. In this case, all components of the effective Stokes vectors are real, while they may be complex in the general case.

The Jones vector of the light that has propagated the reference path and the sensor path is given by $E_r(t) = B_u B_d E(t)$ and $E_s(t) = B_u R_s B_d E(t-\tau_s)$, respectively, where $\tau_s$ is the sensor imbalance. The response matrix is defined as $R = B_d^\dagger B_u^\dagger B_u R_s B_d$. By using the relation between the effective Stokes vector and the Jones vector as given in (12), equation (4) can be written as:

$$I(t) = 2\text{Re}\{E^\dagger(t)B_d^\dagger B_u^\dagger B_u R_s B_d E(t-\tau_s)\} \quad (13)$$

$$= 2\text{Re}\{E^\dagger(t)RE(t-\tau_s)\}$$

$$= 2\text{Re}\{[S_0^{eff}(t)(R_{xx}+R_{yy}) + S_1^{eff}(t)(R_{xx}-R_{yy}) +$$

$$S_2^{eff}(t)(R_{yx}+R_{xy}) + jS_3^{eff}(t)(R_{yx}-R_{xy})]e^{j\Delta\phi(t)}\},$$

A measurement of the response Jones matrix R is performed by continuous or stepwise modulation of the polarization of the transmitter along a predefined path on the Poincaré sphere through a set of polarization states that can be represented by four linearly independent effective Stokes vectors and detection of at least four independent signal components of the generated output intensity modulation.

A measurement of the response Jones matrix can be preformed by modulating the transmitter output SOP through a set of polarization states that can be represented by four linearly independent transmitted Stokes vectors. However, it is possible to provide the set of four linearly independent effective Stokes vectors by less than four linearly independent transmitted Stokes vectors. If the modulation is performed at rate that is comparable to the sensor FSR, the two inferring light beams may originate from different transmitter output SOP. This means that the effective Stokes vectors and the transmitted Stokes vector may no longer be equal. As an example, in the first embodiment, the transmitter provides only two linearly independent transmitted Stokes vectors (the polarization states x and y), while the number of linearly independent effective Stokes vectors is four. Methods that provide the response matrix with a set of less than four linearly independent transmitted Stokes vectors requires a modulation rate and sampling bandwidth that is in the range of the sensor FSR. In conventional CW interrogation, the minimum detection bandwidth is given by the information bandwidth of the interferometric signal. Thus, the minimum detection bandwidth required by these methods is much larger than necessary for CW interrogation of interferometric sensors. While if the transmitter provides four linearly independent transmitted Stokes vectors, the minimum detection bandwidth is limited by information bandwidth of the interferometric signal only.

In one embodiment, the two cascaded polarization modulators $304_1$ and $304_2$ are not parallel or orthogonal and are modulated with different linear rates. Let the incident polarization into the modulators 304 be linear 45°, the first modulator is oriented horizontally and modulated by $\omega_{p1}t$ and the second modulator be oriented rotated 45° and modulated by $\omega_{p2}t$. The signals to the modulators are generated by the pair of phase controllers $306_1$ and $306_2$. The transmitted Stokes vector at the output of the modulators 304 is real and given by, $$S^t(t) = \begin{bmatrix} 1 \\ \frac{1}{2}(\cos(\omega_{p1}+\omega_{p2})t - \cos(\omega_{p2}-\omega_{p1})t) \\ \cos(\omega_{p1}t) \\ \frac{1}{2}(\sin(\omega_{p1}+\omega_{p2})t - \sin(\omega_{p2}-\omega_{p1})t) \end{bmatrix}^T \quad (14)$$

The rates $\omega_{p1}/2\pi$ and $\omega_{p2}/2\pi$ are chosen to be substantially smaller than the sensor FSR, so that the effective Stokes vector becomes equal to the transmitted Stokes vector. This polarization modulation of the source generates seven polarization beat components on the interference signal with frequencies with various offsets to the sub-carrier frequency $\omega$. This gives a total of seven frequencies $\omega-\omega_{p2}-\omega_{p1}$, $\omega-\omega_{p1}$, $\omega+\omega_{p2}-\omega_{p1}$, $\omega$, $\omega-\omega_{p2}+\omega_{p1}$, $\omega+\omega_{p1}$ and $\omega+\omega_{p2}+\omega_{p1}$. Equation (13) can be written, $$I(t) = \text{Re}\begin{Bmatrix} I^{\omega-\omega p2-\omega p1}(t)e^{j(\omega-\omega p2-\omega p1)t} + I^{\omega-\omega p1}(t)e^{j(\omega-\omega p1)t} + \\ I^{\omega+\omega p2-\omega p1}(t)e^{j(\omega+\omega p2-\omega p1)t} + I^{\omega}(t)e^{j\omega t} + \\ I^{\omega-\omega p2+\omega p1}(t)e^{j(\omega-\omega p2+\omega p1)t} + I^{\omega+\omega p1}(t)e^{j(\omega+\omega p1)t} + \\ I^{\omega+\omega p2+\omega p1}(t)e^{j(\omega+\omega p2+\omega p1)t} \end{Bmatrix},$$

where $I^{\omega-\omega p2-\omega p1}(t)$, $I^{\omega-\omega p1}(t)$, $I^{\omega+\omega p2-\omega p1}(t)$, $I^{\omega(t)}$, $I^{\omega-\omega p2+\omega p1}(t)$, $I^{\omega+\omega p1}(t)$ and $I^{\omega+\omega p2+\omega p1}(t)$ are the signal phasors of the signal band centered at the frequency indicated by the superscript. These signal components are given by, $$I^{\omega-\omega p1}(t) = I^{\omega+\omega p1}(t) = \frac{1}{2}(R_{xy} - R_{yx})$$

$$I^{\omega-\omega p2-\omega p1}(t) = I^{\omega+\omega p2-\omega p1}(t) = \frac{1}{4}(R_{xx} - R_{yy} - R_{xy} + R_{yx})$$

$$I^{\omega}(t) = (R_{xy} + R_{yx})$$

$$I^{\omega-\omega p2+\omega p1}(t) = I^{\omega+\omega p2+\omega p1}(t) = \frac{1}{4}(R_{xx} - R_{yy} + R_{xy} - R_{yx})$$

Note that the signal phasors are pair wise equal. From these four independent signal phasors, the components of R can be found.

In an alternative version of the second embodiment, the two polarization modulators 304 in FIG. 3 can be used to set the source polarization states in four subsequent measurements to four linearly independent Stokes vectors $S^k = [S_0^k, S_1^k, S_2^k, S_3^k]$, $k=1,\ldots,4$. As an example, if TDM is used, four subsequent interrogation pulse pairs can have horizontal, vertical, 45° linear and right circular polarization states. These states represent four linearly independent Stokes vectors, and matrix R can be found using Equation (14). Although, this choice of transmitter output SOPs might be the preferred embodiment, any four polarization states that can be represented by four linear independent polarization states can be used. This method can also be applied to systems that do not employ TDM, such as WDM or FDM systems or other systems that employ a continuous wave source. In this case the source polarization should be switched between the four polarization states at a rate that is at least 8 times the information bandwidth of the interferometric signal.

It follows directly from the reciprocity principle that a system comprising a depolarized source and a polarized detector is equivalent to a system comprising a polarized source and an unpolarized detector if the down-lead fiber replaces the up-lead fiber and visa versa.

Figure 4:
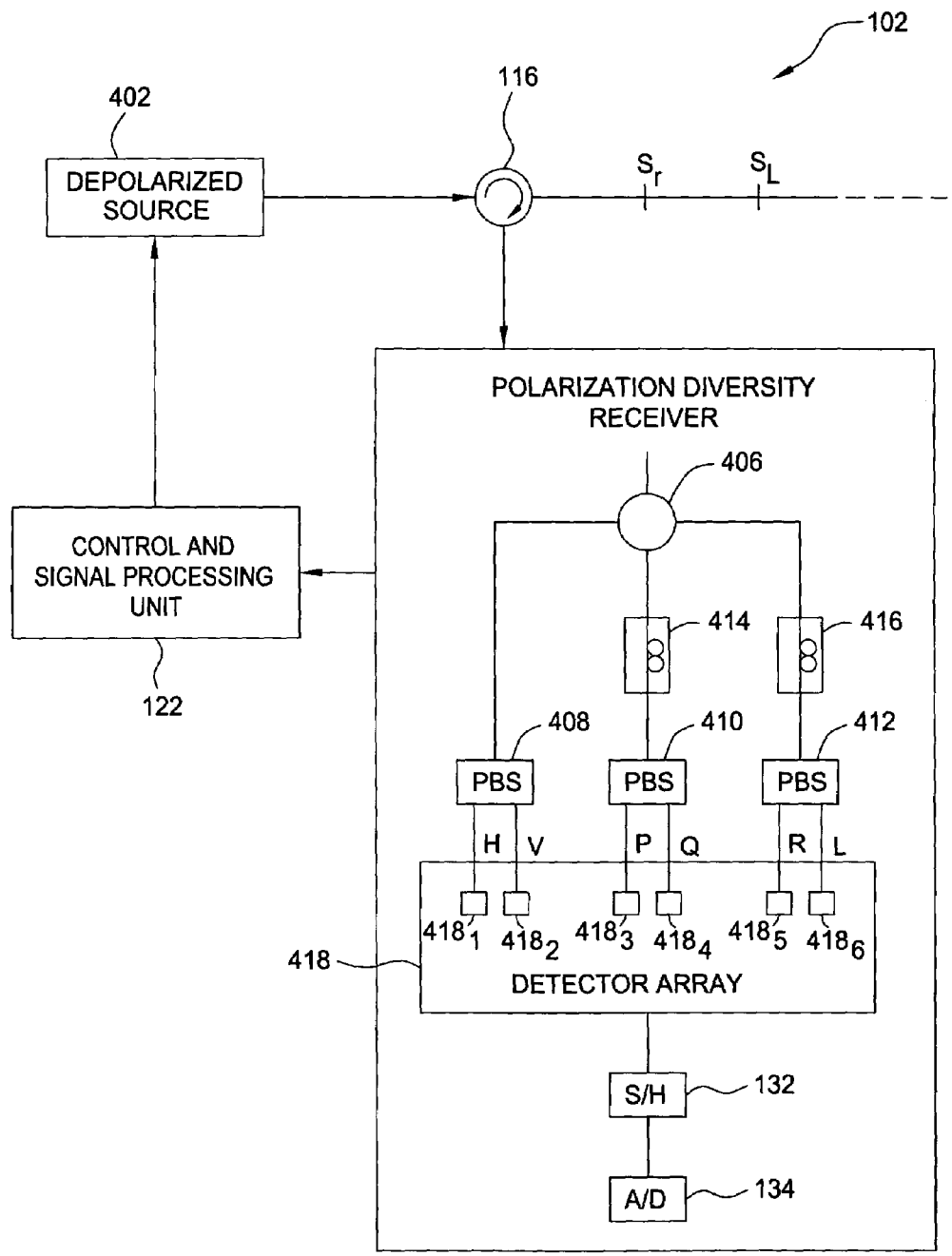
FIG. 4 is a block diagram of a third embodiment of the present invention.

FIG. 4 depicts a third embodiment of the present invention. The third embodiment 400 does not use polarization modulation, but rather has a depolarized source 402 that directly drives, through a circulator 116, the sensor array 102. A polarization diversity receiver 404 that separates the reflected signal into a plurality of polarization components processes the reflected signals from the sensor array 102. The polarization diversity receiver 404 comprises a three-way optical splitter 406, a first polarization beam splitter (PBS) 408, a second PBS 410, and a third PBS 412. Each PBS splits the incoming light into two orthogonal polarization components. This gives a total of six signal outputs that are numbered k=1 to 6. In addition, the signal coupled from the splitter 406 is processed by a polarization controller (PC) 414 prior to entering PBS 410. Similarly, a second polarization controller 416 controls the signal that enters the third PBS 412. An array of optical detectors $418_1$, $418_2$, $418_3$, $418_4$, $418_5$ and $418_6$ (collectively detector array 418) detects the intensity of each of the signal outputs from the polarization beam splitters 408, 410 and 412. The detectors $418_{1-6}$ that are sampled with sample and hold circuits 132 and digitized by A/D converter 134.

The transmission from the input of optical splitter 406 to PBS-output k is described by the Jones matrix $P^k$. The Jones vectors of the light that has propagated the reference path and the sensor path are given by $E_r(t) = P^k B_u B_d E(t)$ and $E_s(t) = P^k B_u R_s B_d E(t-\tau_s)$, respectively. The measured interference between the light propagated along the reference path and the sensor path is given by, $$I_k(t) = 2\text{Re}\{E_r^\dagger(t)E_s(t)\} \quad (15)$$

$$= 2\text{Re}\{E^\dagger(t)B_d^\dagger B_u^\dagger P^k B_u R_s B_d e^{j\Delta\phi(t)}E(t-\tau_s)\}$$

$$= 2\text{Re}\{E^\dagger(t)Q^k E(t-\tau_s)e^{j\Delta\phi(t)}\}$$

$$= 2\text{Re}\{(Q_{xx}^k E_x^*(t)E_x(t-\tau_s) + Q_{yy}^k E_y^*(t)E_y(t-\tau_s) +$$

$$Q_{xy}^k E_y^*(t)E_y(t-\tau_s) + Q_{yx}^k E_y^*(t)E_x(t-\tau_s))e^{j\Delta\phi(t)}\},$$

$$= \text{Re}\{[S_0(t)(Q_{xx}^k + Q_{yy}^k) + S_1(t)(Q_{xx}^k - Q_{yy}^k) +$$

$$S_2(t)(Q_{yx}^k + Q_{xy}^k) + jS_3(t)(Q_{yx}^k - Q_{xy}^k)]e^{j\Delta\phi(t)}\}$$

where $Q^k = B_d^\dagger B_u^\dagger P^k B_u R_s B_d$. Assuming that there is no polarization dependent loss in the lead fiber; then, $B_u = c_u U_u$ and $B_d = c_d U_d$, where $U_u$ and $U_d$ are unitary matrices and $c_d$ and $c_u$ are complex scalars. The matrix $Q^k$ can be written $Q^k = U_d^\dagger U_u^\dagger P^k R U_u U_d$, where $R = |c_d|^2 B_u^\dagger R_s B_u$. Note that the response matrix R is defined differently in this embodiment than in embodiments 1 and 2. In this embodiment, R depends on the propagation through the up-lead fiber, while in embodiments 1 and 2, R depends on the propagation through the down-lead fiber. However, the phase of the eigenvalues of R and $R_s$ are still equal.

Since the source 402 is depolarized, the transmitter output SOP with unity output intensity, can be written $S(t) = [1,0,0,0]$. Thus, the measured interference in (15) is given by, $$I_k(t) = \text{Re}\{(Q_{xx}^k + Q_{yy}^k)e^{j\Delta\phi(t)}\} \quad (16)$$

The sum $Q_{xx}^k + Q_{yy}^k$ defines the trace of matrix $Q^k$. It can be show that $\text{Trace}(Q^k) = \text{Trace}(P^k R)$, thus the measurement of R is not affected by the transformation $U_u U_d$ of $Q^k$. The unitary matrix $U_u U_d$ represents a rotation of the output SOP of the depolarized source 402. A depolarized source includes all SOPs, thus $U_u U_d$ does not affect the source SOP. Without a polarizer, $\text{Trace}(Q^0) = \text{Trace}(R)$, and the detected signal would be $I_0(t) = \text{Re}\{(R_{xx} + R_{yy})e^{j\Delta\phi(t)}\}$.

The output from polarizer k can be described as a projection of the Stokes vector of the incoming light to splitter 406 onto the eigenpolarization of the transmission from the splitter to the polarizer output given by the Stokes vector $S^k=[1,S_1^k,S_2^k,S_3^k]$. It can be shown that (16) can be written, $$I_k(t)=Re\{(R_{xx}+R_{yy}+S_1^k(R_{xx}-R_{yy})+S_2^k(R_{yx}+R_{xy})+jS_3^k (R_{yx}-R_{xy}))e^{j\Delta\phi(t)}\} k=1,2,3,\ldots \quad (17)$$

The similarity between equation (13) and equation (17) demonstrates the reciprocity principle which gives that a system comprising a depolarized source and a polarized detector is equivalent to a system comprising a polarized source and an unpolarized detector. At least four measurements of polarized outputs that can be represented by four linearly independent Stokes vectors are required in order to extract the four components of R. A polarization diversity receiver that can measure all components of the Stokes vector of the incoming light defines a Stokes analyzer, and any type of Stokes analyzer can be used for a measurement of R.

The polarization controllers (PC) 414 and 416 are used to adjust the orientation of the input SOPs to the splitter 406 that are projected by the PBS's 410 and 412. The SOP that is projected by the first PBS 408 is defined as horizontal(H) and vertical(V) SOPs, which is represented by Stokes vectors [1,1,0,0] and [1,−1,0,0], respectively. The polarization controller 414 is adjusted so that PBS 410 projects linear 45 degrees (P) and linear −45 degrees (Q) SOPs, which is represented by Stokes vectors [1,0,1,0] and [1,0,−1,0], respectively. The polarization controller 416 is adjusted so that PBS 412 projects right circular(R) and left circular(L) SOPs, which is represented by Stokes vectors [1,0,0,1] and [1,0,0,−1], respectively.

In second version of the third embodiment three-way optical splitter 406 is replaced by a four-way optical splitter, and polarizers with output to only one detector each is used. The power in one of the outputs of the splitter is measured without a polarizer before the detector. This projection is represented by Stokes vector [1,0,0,0]. The three other outputs may project the incoming light to splitter 406 into horizontal(H) SOP, linear 45 degrees (P) SOP and right circular(R)SOP. However, using a polarization diversity receiver not comprising polarization splitters, half the power will be wasted on average compared to a polarization diversity receiver based on polarization splitters. Although these projections of the incoming light may be the preferred embodiments, any other projections can be used provided that four known and linearly independent Stokes vectors can represent the projections.

In a third version of the third embodiment, a time-varying Stokes analyzer is used. A time-varying Stokes analyzer comprises one or a plurality of polarizers. These polarizers may rotate so that a time-varying Stokes vector describes the eigenpolarization of the polarizer. Alternatively, a time-varying Stokes vector can be generated by placing one or a plurality of polarization modulators 304 in FIG. 3 before the polarizer. The combined set of the eigenpolarizations of all the polarizers must include at least four states that can be represented by four independent Stokes vectors.

The method of the third embodiment works with all the multiplexing techniques, (e.g., TDM, FDM and WDM), although the method used for generating depolarized light for interrogation may be different for each type of multiplexing. A source is sufficiently depolarized if the cross-correlation between orthogonal polarizations of the source does not contribute to the demodulated signal. This can for instance be achieved by letting the difference in optical frequency between the polarization modes of the source be outside frequency bands from which the sensor phase is calculated. Depolarization can be achieved using a source that combines two laser signals with orthogonal polarizations and different optical frequencies. A source can also be made depolarized by shifting the optical frequency of one of the polarization modes by a frequency larger than the detection bandwidth using, for example, an acousto-optic modulator (AOM), or by switching the source SOP between two orthogonal polarizations quickly.

Figure 5:
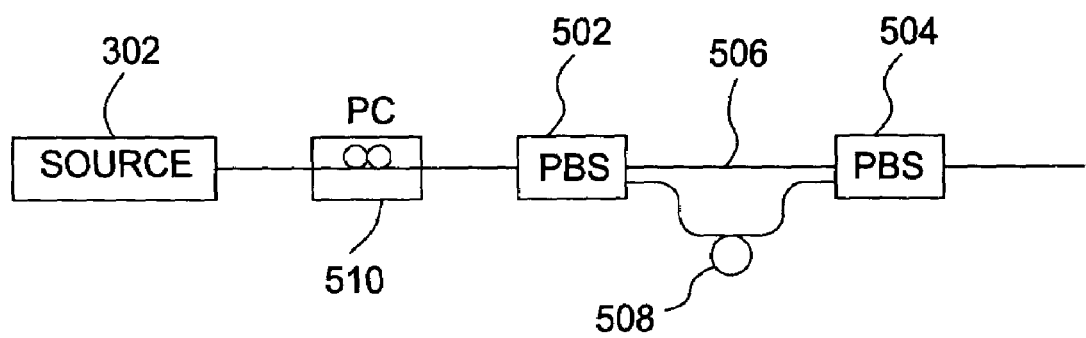
FIG. 5 is a further detailed block diagram of a source used with the third embodiment.

Passive depolarization can be achieved using a depolarizing interferometer 500 shown in FIG. 5. The depolarizing interferometer 500 comprises two polarization beam splitters (PBSs) 502 and 504, a polarization controller 510 and two lengths of polarization maintaining fibers 506 and 508. The beam splitter 504 is operating as a beam combiner. The polarization controller 510 adjusts the SOP into PBS 502 so that outputs of the PBS have equal power. Each output of PBS 502 is connected to an input of PBS 504 using polarization maintaining (PM) fibers 506 and 508. The PM fibers ensure that the SOPs of the outputs of PBS 502 remain orthogonal at the inputs of PBS 504. A depolarizing interferometer 500 utilizes the limited temporal coherence of the light to generate depolarized light. To every optical signal, it is associated an autocorrelation function, which describes the amount of suppression of an interference signal component on the demodulated signal as function of the difference in delay between the two interfering signals. The difference in delay of the light propagating in fiber 506 and 508 is such that the interference components with this delay difference are sufficiently suppressed in the demodulation process. This method can be used in TDM if the coherence length of the source is significantly less than the length of the interrogation pulses. In FDM, the laser source is swept, so that different electrical signal frequencies are generated at the detector corresponding to different delay difference of the two interfering signals. Thus, in FDM the source can be made depolarized by selecting a delay of the depolarizing interferometer such that the cross-correlation between orthogonal polarizations of the source does not appear on the extracted electrical signal frequencies.

A fourth embodiment of the invention combines embodiment two and three by having both a polarized source and a polarized receiver. In this embodiment, a polarization diversity receiver with a multiple of detectors replaces the detector 118 in FIG. 3. When a polarization beam splitter is used within a polarization diversity receiver, only one polarization modulator 304 is required. A single polarization modulator can modulate the transmitter output SOP through a set of states that can be represented by a maximum of three independent Stokes vectors. The combination of a polarization modulator and a polarization beam splitter with two detector outputs may provide three independent signal components at each detector, giving a total of six signal components from which the response Jones matrix can be found.

With a polarizer k described by the Jones matrix $P^k$ is placed before the detector, the Jones vector of the light that has propagated the reference path and the sensor path is given by $E_r(t)=P^k B_u B_d E(t)$ and $E_s(t)=P^k B_u R_s B_d E(t-\tau_s)$, respectively. The measured interference between the light propagated the reference path and the sensor path is given by (15). Assuming that there is no polarization dependent loss in the lead fibers and that the propagation through the lead fibers can be described by matrices on a form as given in (10); then, $B_u=c_u U_u$ and $B_d=c_d U_d$, where $c_u$ and $c_d$ are complex scalars, and $U_u$ and $U_d$ are unitary matrices. This gives $Q^k=P'^k R$, where $P'^k=U_d^\dagger U_u^\dagger P^k U_u U_d$ and $R=|c_u|^2 B_d^\dagger R_s B_d$. Thus, $P^{k,}$ described the polarizer transformed by the matrix $U_u U_d$, which is arbitrary. This transformation can be described by two real parameters. Thus, the response matrix R and the transformation of the polarizers can be found from at least six independent signal components that appears if the transmitter output SOP is modulated through a set of states that can be represented by at least three independent Stokes vectors and a set of eigenpolarizations of the polarization diversity receiver that can be represented by at least two independent Stokes vectors.

In a fifth embodiment, the response matrix R can be found if the transmitter output SOP is modulated through a set of states that can be represented by at least two independent Stokes vectors and set of eigenpolarizations of the polarization diversity receiver that can be represented by at least three independent Stokes vectors. This is the reciprocal version of the forth embodiment, and this embodiment will give the same set of measured signal components as the forth embodiment if the up-lead fiber replaces the down-lead fiber and visa versa.

In FDM systems, the laser can be swept over a range much larger than the free spectral range of the sensor, which gives a fringe signal with an electrical frequency at the detector that is proportional to the delay of the sensor. The phase of the fringe signal relative to the source frequency is a measure for the sensor phase. The frequency of the fringe signal provides a measurement of the delay of the sensor. See X. Wan et. al "Fiber-Bragg-Grating Pair Interferometer Sensor with Improved Multiplexing Capacity and High Resolution", IEEE Photon. Tech. Letters, Vol 15, pp 742–744, 2003. When a FDM system is combined with this invention, the measurement can be extended to include a common-mode phase response, a common-mode delay response, differential birefringent phase and differential birefringent delay that is immune to fluctuations in lead fiber birefringence, where the differential birefringent delay is defined as the difference in transmission delay of the two eigenpolarizations of the sensor.

While foregoing is directed to specific embodiments of the present invention, other and further embodiments of the invention may be devised without departing from the basic scope thereof, and the scope thereof is determined by the claims that follow.

The invention claimed is:

1. A method for determining sensor response in an interferometric sensor system comprising:
    generating an interrogation signal for an interferometric sensor array, where the interrogation signal comprises a plurality of pulses;
    switching a polarization of one pulse in each successive pulse pair defined by the plurality of pulses to create at least four different pulse pairs;
    receiving a responsive signal from at least one sensor within the interferometric sensor array comprising at least four independent signal components carrying information about a system response matrix associated with each of the at least one sensors; and
    extracting information from the at least four independent signal components concerning a Jones Matrix of a sensor.

2. The method of claim 1 wherein the plurality of pulses comprises at least one pulse pair and the polarization is switched between the pulses in the at least one pulse pair.

3. The method of claim 1 further comprising determining a common mode phase response of the sensor.

4. The method of claim 1 further comprising determining a differential birefringent response of the sensor.

5. The method of claim 1 wherein the interrogation signal has a varying optical frequency.

6. The method of claim 2 wherein the at least one pulse pair comprises a first pulse and a second pulse, where a separation of an end of the first pulse to a beginning of the second pulse is less than the interferometric delay of the sensor.

7. The method of claim 1 wherein the polarization is switched between orthogonal polarization states.

8. The method of claim 2 wherein the polarization is switched between orthogonal polarization states and the at least one pulse pairs has a unique combination of polarization states.

9. The method of claim 2 wherein the polarization of each pulse in the at least one pulse pair comprises a combination of two components of orthogonal polarization states.

10. The method of claim 9 wherein the combination is time varying and individually controlled for each pulse.

11. The method of claim 9 wherein the phase of each of the two components is modulated.

12. The method of claim 11 further comprising filtering the reflected signal to produce separated signals that comprise information about the system response matrix associated with each of the at least one sensors.

13. The method of claim 11 further comprising modulating each component using a different linear rate to form at least four separable signal components.

14. A method for determining sensor response in an interferometric sensor system comprising:
    producing an interrogation signal comprising polarization states that are defined by one or more linearly independent transmitted Stokes vectors;
    applying the interrogation signal to an interferometric sensor array;
    receiving a responsive signal from at least one sensor within the interferometric sensor array using a plurality of receiver channels that project the responsive signal onto one or more linearly independent receiver Stokes vectors; and
    extracting a multiple of extracted signal components representing different combinations of the one or more linearly independent transmitted Stokes vectors and the one or more linearly independent receiver Stokes vectors;
    where the multiple of extracted signal components form a total number of signal components that comprise information about a system response matrix associated with the at least one sensor and enable the extraction of information regarding a Jones Matrix of the at least one sensor.

15. The method of claim 14 wherein the signal components comprise linearly independent transmitted Stokes vectors.

16. The method of claim 14 wherein the product of the total number of transmitted polarization states and the total number of receiver channels is at least four.

17. The method of claim 14 wherein at least one linear combination of the linearly independent transmitted Stokes vectors provides a Stokes vector that represents a depolarized polarization state and the total number of receiver channels is at least four.

18. The method of claim 17 wherein the interrogation signal comprises at least one depolarized polarization state.

19. The method of claim 14 wherein at least one linear combination of the linearly independent receiver Stokes vectors provides a Stokes vector that represents an unpolarized receiver channel and a total number of linearly independent transmitted Stokes vectors is at least four.

20. The method of claim 14 wherein the total number of linearly independent transmitted Stokes vectors is at least two and the total number of linearly independent receiver Stokes vectors is at least two, and the product of the total number of linearly independent transmitted Stokes vectors and the total number of linearly independent receiver Stokes vectors is at least six.

21. The method of claim 14 wherein a state of polarization of the interrogation signal is modulated between one or more transmitted polarization states.

22. The method of claim 21 wherein the modulation is at least one of continuous and step-wise.

23. The method of claim 14 wherein the receiver comprises one or more detectors, the outputs from each of the one or more detectors defining a receiver channel.

24. The method of claim 14 wherein the receiving step further comprises detecting components of the responsive signals projected onto a varying state of polarization that is modulated between polarization states defined by the linearly independent receiver Stokes vectors.

25. The method of claim 24 wherein the modulation is at least one of continuous and step-wise.

26. The method of claim 14 wherein the extracting step further comprises separating signal components in the frequency domain.

27. The method of claim 14 wherein the extracting step further comprises separating signal components in the time domain.

28. The method of claim 14 wherein the producing step further comprising generating at least one pulse pair.

29. The method of claim 28 further comprising switching a polarization between the pulses in the at least one pulse pair.

30. The method of claim 14 further comprising determining a common mode phase response of the sensor.

31. The method of claim 14 further comprising determining a differential birefringent response of the sensor.

32. The method of claim 14 wherein the interrogation signal has a varying optical frequency.

33. The method of claim 32 further comprising determining a common mode delay response of the sensor.

34. The method of claim 32 further comprising determining a differential birefringent delay response of the sensor.

35. The method of claim 28 wherein the at least one pulse pair comprises a first pulse and a second pulse, where a separation of an end of the first pulse to a beginning of the second pulse is less than a interferometric delay of the sensor.

36. The method of claim 29 wherein the polarization is switched between orthogonal polarization states.

37. The method of claim 36 wherein the polarization is switched between orthogonal polarization states and the at least one pulse pairs has a unique combination of polarization states.

38. The method of claim 29 wherein the polarization of each pulse in the at least one pulse pair comprises a combination of two components of orthogonal polarization states.

39. The method of claim 38 wherein the combination is time varying and individually controlled for each pulse.

40. The method of claim 38 wherein the phase of each of the two components is modulated.

41. The method of claim 40 further comprising filtering the reflected signal to produce the one or more additional signal components.

42. The method of claim 41 further comprising modulating each component using a different linear rate to form at least four separable signal components.

43. A method for determining sensor phase in an interferometric sensor system comprising:
producing an interrogation signal for an interferometric sensor array, where the interrogation signal defines at least four independent Stokes vectors;
applying the interrogation signal to an interferometric sensor array having at least one sensor;
receiving a responsive signal from the interferometric sensor array; and
computing a Jones matrix for the at least one sensor in said interferometric sensor array in response to the responsive signal.

44. The method of claim 43 wherein the producing step comprises:
modulating a state of polarization of an optical signal along a predefined path on the Poincaré' sphere to produce the interrogation signal.

45. The method of claim 43 wherein the at least tour independent Stokes vectors are produced by modulating the interrogation signal using at least one of phase modulation, polarization modulation and frequency modulation.

46. The method of claim 45 wherein the modulation is at least one of continuous and step-wise.

47. A method for determining sensor phase delay in an interferometric sensor system comprising:
generating an interrogation signal for an interferometric sensor array having at least one sensor, where the interrogation signal is depolarized;
receiving a responsive signal from the interferometric sensor array using a polarization diversity receiver to separate the responsive signal into a plurality of polarization components; and
extracting from the plurality of polarization components information concerning a Jones matrix for the at least one sensor.

48. The method of claim 47 wherein the plurality of polarization components comprise horizontal, vertical, right circular, left circular, 45 degree and −45 degree.

49. The method of claim 47 wherein the interrogation signal is a frequency swept signal and the sensor array is an imbalanced array.

50. An apparatus for determining sensor phase delay in an interferometric sensor system, comprising:
a source for generating an interrogation signal for an interferometric sensor array having at least one sensor, where the interrogation signal is depolarized;
a polarization diversity receiver for receiving a responsive signal from the interferometric sensor array and separating the responsive signal into a plurality of polarization components; and
a processor for extracting from the plurality of polarization components information concerning a Jones matrix for the at least one sensor.

51. An apparatus for determining sensor response in an interferometric sensor system, comprising:
means for generating an interrogation signal for an interferometric sensor array, where the interrogation signal comprises a plurality of pulses;

means for switching a polarization of one pulse in each successive pulse pair defined by the plurality of pulses to create at least four different pulse pairs;

means for receiving a responsive signal from at least one sensor within the interferometric sensor array comprising at least four independent signal components carrying information about a system response matrix associated with each of the at least one sensors; and means for extracting information from the at least four independent signal components concerning a Jones Matrix of a sensor.

52. An apparatus for determining sensor phase in an interferometric sensor system, comprising:

an interferometric sensor array having at least one sensor;

a source for producing an interrogation signal for applying to the interferometric sensor array, wherein the interrogation signal defines at least four independent Stokes vectors;

a receiver for receiving a responsive signal from the interferometric sensor array; and a processor for computing a Jones matrix for the at least one sensor in said interferometric sensor array in response to the responsive signal.

* * * * *